United States Patent [19]
Bathrick et al.

[11] Patent Number: 5,010,572
[45] Date of Patent: Apr. 23, 1991

[54] DISTRIBUTED INFORMATION SYSTEM HAVING AUTOMATIC INVOCATION OF KEY MANAGEMENT NEGOTIATIONS PROTOCOL AND METHOD

[75] Inventors: Erwin W. Bathrick, La Habra; James E. Zmuda, El Toro, both of Calif.

[73] Assignee: Hughes Aircraft Company, Los Angeles, Calif.

[21] Appl. No.: 515,819

[22] Filed: Apr. 27, 1990

[51] Int. Cl.⁵ .............................................. H04I 9/02
[52] U.S. Cl. ........................................ 380/21; 380/23
[58] Field of Search ....................... 380/21, 23, 24, 25, 380/43, 44, 45, 46, 47; 364/246.7, 252.3, 246.9, 252.4, 918.7, 958.1, 958.2, 969, 969.1

[56] References Cited
U.S. PATENT DOCUMENTS

| | | | |
|---|---|---|---|
| 4,881,263 | 11/1989 | Herbison et al. | 380/21 |
| 4,882,752 | 11/1989 | Lindman et al. | 380/25 |
| 4,888,800 | 12/1989 | Marshall et al. | 380/21 |
| 4,912,762 | 3/1990 | Lee et al. | 380/24 |
| 4,919,545 | 4/1990 | Yu | 380/25 |
| 4,941,176 | 7/1990 | Matyas et al. | 380/21 |

Primary Examiner—Thomas H. Tarcza
Assistant Examiner—Tod Swann
Attorney, Agent, or Firm—Wanda K. Denson-Low

[57] ABSTRACT

The invention is an improved distributed information system which automatically provides for the transmission of security protocol data units between end-users of a distributed information system. The invention compares the address and security key of a received security protocol data unit to stored end-system addresses and security key information and, in the absence of an existing end-system address and security key, automatically initiates negotiation of a security key between end-systems and then confirms the negotiated security key and initiates a security protocol transmission of the data unit. A method af automatic invoking secure communications between end-systems of a distributed information system is also disclosed.

4 Claims, 2 Drawing Sheets

DISTRIBUTED INFORMATION SYSTEM HAVING AUTOMATIC INVOCATION OF KEY MANAGEMENT NEGOTIATIONS PROTOCOL AND METHOD

BACKGROUND

The present invention relates generally to distributed information systems and in particular to a distributed information system which automatically invokes and establishes secure data transfers between elements of the system.

Contemporary computer systems catagorized as distributed information systems have various portions thereof located at geographically separated sites. A distributed information system may also take the form of an information system in which different functions of the system are performed by different computers at a single site. Combinations of these types of distributed systems also exist. For effective and reliable operation of a distributed information system, communications systems connecting the various elements or end-systems must be able to securely convey information between the end-systems without danger of eavesdropping or modification of the transmitted data. The requirements for communications security requires the secure establishement of encryption keys and/or security protocols between end-systems desiring to communicate.

Typically, before accepting requests for the secure transmission of data, an authorized security person manually negotiates and secures agreement in advance of keying material and protocols to be used between communicating parties or end-systems. For example, cryptographic modems function in this manner. This manual intervention is time consuming and results in delay of data transfers.

It is an objective of the present invention to provide an improved distributed information system wherein, in response to a request for transfer of secure data, the system automatically invokes the negotiation of keying material and protocol to be used for that instance of communication. Another objective of the invention is to provide a system in which secure data communication is provided with minimal delay between elements of the system for which an appropriate security key and agreement on security protocol already exists. Another objective of the invention is provision of a system in which transmission of data not requiring a security protocol is automatically affected without interruption of the data transfer.

SUMMARY OF THE INVENTION

Broadly, the invention, which may be implemented within a general purpose computer, includes storage means (herein called the "Secure Address Store" or SAS) for storing, for each end-system with which secure communications is ongoing, the addresses and the corresponding security protocol and keys to be used to communicate with that end-system. Also provided is a storage means (herein called the "Protocol Address Store" or PAS) for storing the addresses and security protocols to be used to communicate with all other end-systems of the information system. All end-systems of the distributed system include means for receiving and transmitting data units in accordance with the security protocols. The invention includes processing means which, upon reception of a request for the transmission of a protocol data unit, automatically searches the "Secure Address Store" for an entry whose address matches the destination address of the protocol data unit. If an entry is found in the "Secure Address Store" with such an address, then the protocol data unit is automatically transmitted in accordance with the appropriate security protocol, and protected with the appropriate key. If no match is found, the security protocol of the data unit is compared with entries in the "Protocol Address Store". If no match is found in the "Protocol Address Store", no security protocol is required and this protocol data unit may be automatically transmitted without a security protocol. If a match is found in the "Protocol Address Store" the invention automatically invokes the appropriate process negotiation to obtain a key and a determination of which security protocol to use.

The negotiation process required to obtain the key and determine the security protocol to use may take a significant amount of time. Accordingly, means are provided to suspend further processing of the protocol data unit until a negotiation completion signal is returned from the negotiation process. Upon receipt of the negotiation completion signal, further processing of the protocol data unit includes the application of the appropriate security protocol and automatic transmission of the data unit. Means may also be provided to update the "Secure Address Store" to enter the address, security protocol, and security key to be used when communicating with this end-system. This allows additional data-units to be more speedily processed by the steps.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
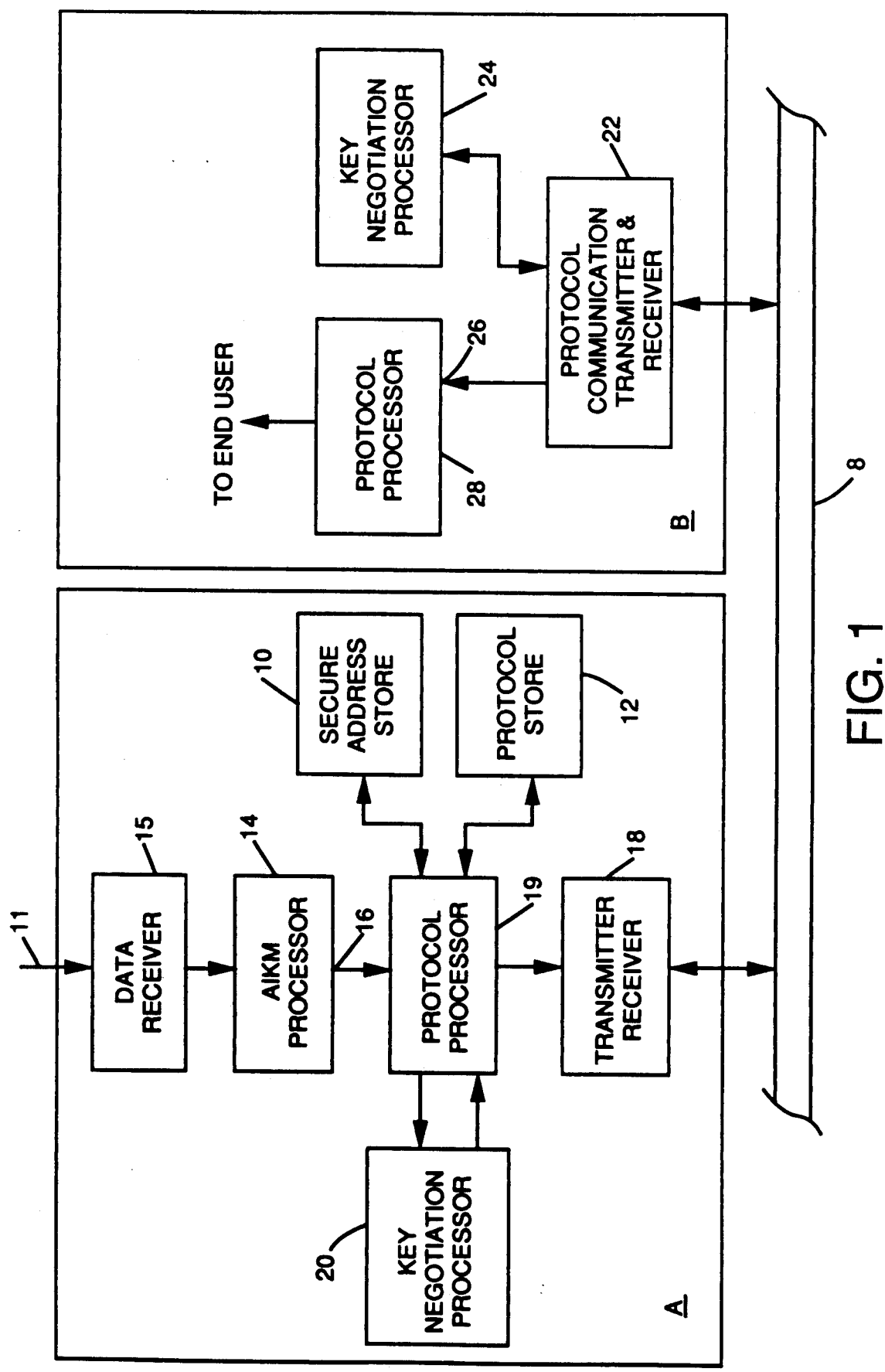
FIG. 1 is a block diagram of the improved distributed information system of the present invention.

Referring first to FIG. 1, there is illustrated a simplified block diagram of a distributed information system in accordance with the invention, which system comprises an end-system A and an end-system B. The distributed information system may comprise many end-systems, but a single end-system pair A, is, however, sufficient to explain operation of the invention.

End-system A includes Secure Address Store (SAS) storage means 10, and a protocol address store (PAS) storage means 12. The SAS and PAS storage means 10, 12 are communicatively coupled to an automatic invocation of key management (AIKM) processor 14. Stored in the SAS storage means 10 is the set of all existing approved addresses and corresponding security keys and security protocols for all end-systems A, B in the distributed information system. Stored in the PAS storage means 12 is the set of all end-system address for which a security protocol must be executed in the distributed information system.

The AIKM processor 14 is also connected to receive the output of a data unit receiver 15 which is in turn connected to receive a data unit from any of a number of sources, such as for example, a computer memory, an input/output terminal or an automatic data generating device, via an input 11. The AIKM processor 14 has an ouput 16 connected to end-system A transmitter/receiver 18 through a protocol processor 19 which performs the required security protocol processing of the data unit. A key negotiation processor 20 communicates with AIKM processing means 14 and the transmittet/receiver 18.

End-system B includes a transmitter/receiver 22 connected to communication medium 8. The transmitter/receiver 22 is also connected to a key negotiation processor 24 and to an input 26 of end-system B security protocol processor 28.

Figure 2:
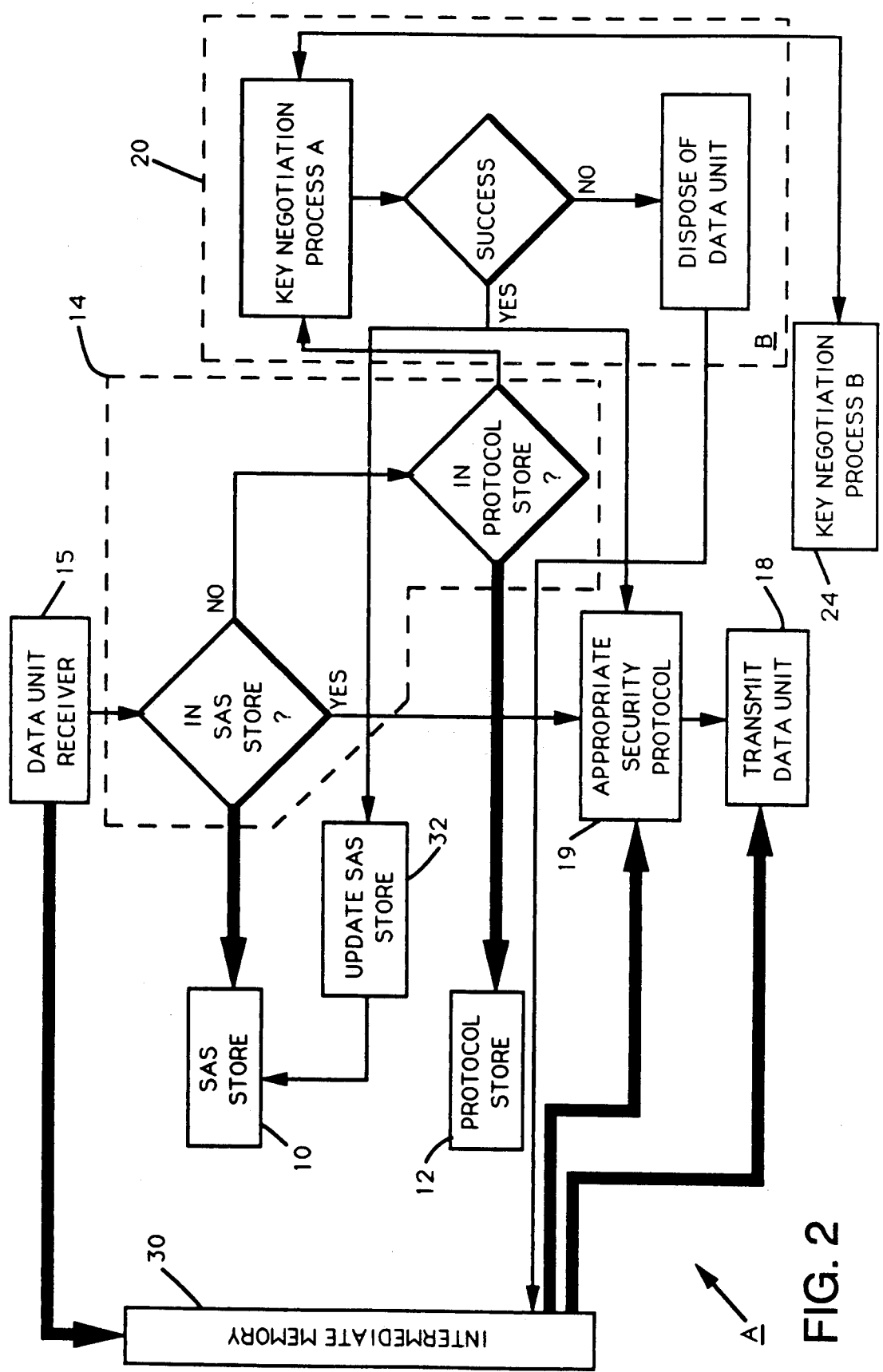
FIG. 2 is a flow diagram useful in explaining the sequential processing of a security protocol data unit by the system of the present invention.

Referring now to FIG. 2, the operation of the system of this invention is automatically initiated upon reception of a data unit by the data receiver 15. The data unit includes the address of the end-system to receive the data unit and a security protocol identification or specification. Security protocol specifications may be range from simple data transmission accuracy protocols to complex encryption protocols. Typically, the data unit is passed by the data unit receiver 15 into an intermediate memory 30.

The data unit receiver 15, upon receipt of the data unit, generates and applies a data unit transfer signal to AIKM processor 14 to activate the AIKM processor 14. In response, AIKM processor 14 compares the address of the end-system identified in the data unit with the addresses and security keys of end-systems stored in the SAS storage means 10. If a match is found, the AIKM processor 14 generates a data transfer enable signal to activate the protocol processor 19. The protocol processor retrieves the data unit from the intermediate memory 20 and applies the appropriate security protocol to the data unit. The data unit will then be passed to the data unit transmitter/receiver 18 where it will be transmitted via communication medium 8 according to the communications protocols employed within the distributed information system.

On the other hand, if the AIKM processor 14 does not find the address of the data unit in the SAS storage means 10, then AIKM processor 14 compares the address in of the data unit with all the end-system addresses that require security protocols for transmission of the data unit stored in PAS storage means 12. If no match is found, the AIKM processor 14 activates the transmitter/receiver 18. The transmitter/receiver 18 then transmits this data unit directly. Note that in this case the data unit is transmitted without any applied security protocol. This is a byspass mode of operation.

If the AIKM processor 14 does find a match, then a security key protocol request signal is generated to activate the key negotiation processor 20 and, in addition, suspends processing data units with the same address as the data unit in process. This will cause the data unit receive 15 to ignore further data units with the same address as the data unit in process until processing and transmission of the data unit. The key negotiation processor 20 now communicates with the key negotiation processor 24 of end system B via transmitter/receivers 18, 22 and communications medium 8. The two key negotiations processors 20, 24 perform a fully encrypted negotiation exchange to securely establish a security protocol key and protocol specification for the end-system B appropriate for the exchange of the data unit in process.

Upon completion of the key negotiation process, a key negotiation confirm signal is generated by the key negotiation processors 20, 24, and the key negotiation processor 20 checks the negotiation confirm signal received from the key negotiation processor 24 to determine that the key negotiation process was successful. If successful, the AIKM processor 14 effects transfer of the data unit to security protocol processor 19, which processes the data unit as required by the protocol specification. The security protocol processed data unit is then passed to transmitter/receiver 18 and transmitted to end-system B. The AIKM processor 14 then releases any and all resources of the system dedicated to this data unit. The AIKM processor 14 also activates an update secure address unit 30 to update the SAS storage means 10 with the now existing address around corresponding security key for end-system B.

In the event that the key negotiation processors 20, 24 cannot complete the required negotiation, the AIKM processor 14 disposes of the data unit. This may occur, for example, if an end-system is unable to perform a specific required security protocol data transfer.

It will now be appreciated that the present invention also discloses a method for performing the automatic invocation of secure communications between end-systems of a distributed information system. The method of the sequence of steps described above in reference to FIG. 2 and comprises the steps of storing a set of end-system addresses and corresponding security keys and security protocol specifications (SAS addresses) and storing a set of addresses of end-systems that require a security protocol for data unit transmission (PAS addresses). In response to generation of a data unit, which includes an end-system address and a corresponding required security protocol, the method generates a data transfer request signal.

In response to the data transfer request signal, the next step in the method is to compare the data unit address with the end-system addresses, security keys and protocol specifications. In response to a match, a transmit enable signal is generated. In response to the absence of a match, the data unit address is compared with the stored PAS address. In response to a match between addresses, an automatic invocation of key management request signal is generated. In response to this request to this request signal, an encrypted security key negotiation is performed and an appropriate security key is generated. Upon generation of the security key, a transfer enable signal is generated and a security protocol data transfer is performed. The security protocol processor 28 of end-system B receives the data unit from end-system A and applies the appropriate security protocol when decoding data. The data unit is then passed to the end-system B user.

Thus there has been described a new and improved distributed information system having automatic invocation of key management negotiation protocol and a method of invoking secure communications. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. In a distributed information system which includes a plurality of end-systems each of which includes data unit transmitting and receiving means having a security protocol and a corresponding security protocol key from one end-system to another end-system, the improvement comprising:

secure address storage means for storing a set of end-system addresses and corresponding end-system security protocol keys;

protocol address storage means for storing a set of end-system addresses requiring security protocol data transfers;

data unit receiver means for receiving a data unit and for generating a data unit transfer request signal which includes an end-system address and data unit security protocol;

intermediate storage means for storing a received data unit in response of a data transfer request signal and outputting the stored data unit to the end-system transmitting and receiving means in response to a transfer enable signal;

automatic key management processor means responsive to the data unit transfer request signal for comparing the received data unit security key and end-system address to the set of end system address and security protocol keys, and for generating the transfer enable signal in response to a match therebetween, and in the absence of a match therebetween, comparing the received data unit address to the end-system addresses from the protocol address storage means and generating a security key protocol request signal in response to a match therebetween, and for generating the transfer enable signal in response to the absence of a match between the data unit address and an address in the set of addresses stored in the protocol address storage means;

security key negotiating means responsive to the security key protocol request signal for negotiating a security key with another end-system and for generating a security key negotiation confirm signal upon completion of a negotiation;

means responsive to the security key negotiation confirm signal for storing the security key for the another end-system in the one system secure address store storage means;

and wherein each end-system is responsive to the security key negotiation confirm signal and is adapted to generate the transfer enable signal, and wherein the end-system data unit transmitting and receiving means are responsive to the transfer enable signal and are adapted to transfer the data unit corresponding to the security protocol of the received data unit, and wherein the security key negotiation comprises a fully encrypted negotiation exchange.

2. The system of claim 1 wherein the transmitting and receiving means include means for performing security protocol data transfer.

3. The system of claim 2 wherein the automatic key negotiation means further includes means for disposing of data unit in response to the absence of the security key protocol confirm signal.

4. A method of automatic invoking secure communications between end-systems of a distributed information system, said method comprising the steps of;

(a) storing a set of end-system addresses and corresponding security keys and security protocol specifications;

(b) storing a set of end-system addresses that includes the addresses of all end-systems requiring security protocols for a secure data transfer;

(c) generating a data that includes an end-system address and security protocol specification, and generating a data transfer request signal in response thereto;

(d) comparing the generated end-system address and protocol specification to the set of end-system addresses and protocol specifications in response to the data transfer signal, and generating a transmit enable signal in response to a match therebetween;

(e) comparing the data unit specification to the set of end-system addresses requiring a security protocol;

(f) generating an automatic invocation of key management request signal in response to the absence of a match between the data unit specification to the set of end-system addresses requiring a security protocol;

(g) performing an encrypted security key negotiation between the end-systems in response to the invocation of the key management request signal and generating a security key confirm signal in response to completion thereof;

(h) generating a transfer enable signal a response to the security key confirm signal;

(i) performing a security protocol data transfer in accordance with the appropriate security protocol specification in response to the transfer enable signal;

(j) generating the transfer enable signal in the absence of a match between the data unit address and an end-system address for which a security protocol is required;

(k) storing a negotiated security key in the set of stored end-system addresses and corresponding security keys and protocol specifications in response to the security key negotiation confirm signal; and (l) storing a received data unit in an intermediate storage means during the performance of steps (b) through (g).

* * * * *